US010182382B2

(12) United States Patent
Ahmad et al.

(10) Patent No.: US 10,182,382 B2
(45) Date of Patent: Jan. 15, 2019

(54) LOCAL OFFLOAD AND SMALL CELL ARCHITECTURE (SCA)

(71) Applicant: INTERDIGITAL PATENT HOLDINGS, INC., Wilmington, DE (US)

(72) Inventors: Saad Ahmad, Montreal (CA); Guanzhou Wang, Brossard (CA); Li-Hsiang Sun, Smithtown, NY (US); Amir Helmy, Cairo (EG)

(73) Assignee: InterDigital Patent Holdings, Inc., Wilmington, DE (US)

(*) Notice: Subject to any disclaimer, the term of this patent is extended or adjusted under 35 U.S.C. 154(b) by 164 days.

(21) Appl. No.: 15/122,285

(22) PCT Filed: Mar. 13, 2015

(86) PCT No.: PCT/US2015/020459
§ 371 (c)(1),
(2) Date: Aug. 29, 2016

(87) PCT Pub. No.: WO2015/138908
PCT Pub. Date: Sep. 17, 2015

(65) Prior Publication Data
US 2016/0373987 A1    Dec. 22, 2016

Related U.S. Application Data

(60) Provisional application No. 61/952,859, filed on Mar. 13, 2014.

(51) Int. Cl.
H04W 36/22    (2009.01)
H04W 74/08    (2009.01)
(Continued)

(52) U.S. Cl.
CPC ....... *H04W 36/22* (2013.01); *H04W 74/0833* (2013.01); *H04W 76/12* (2018.02);
(Continued)

(58) Field of Classification Search
CPC ... H04W 76/00; H04W 76/02; H04W 76/025; H04W 24/02; H04W 36/08; H04W 36/12;
(Continued)

(56) References Cited

U.S. PATENT DOCUMENTS

2010/0272013 A1    10/2010 Horn et al.
2010/0278108 A1    11/2010 Cho et al.
(Continued)

FOREIGN PATENT DOCUMENTS

JP    2014-030202 A    2/2014
RU    2011143727 A    5/2013
(Continued)

OTHER PUBLICATIONS

3rd Generation Partnership Project (3GPP), R3-130834, "Support of SIPTO@LN in RAN3", CATT, 3GPP TSG RAN WG3#80, Fukuoka, Japan, May 20-24, 2013, 3 pages.
(Continued)

*Primary Examiner* — Mohamed A Kamara
(74) *Attorney, Agent, or Firm* — Condo Roccia Koptiw LLP

(57) ABSTRACT

Small cell enhancement for dual connectivity operation and/or the impact of such enhancement for the support of the example LIPA/SIPTO architecture may be useful. The L-GW shown could be a collocated L-GW (e.g., with S-GW not shown) and/or a standalone L-GW with S-GW capabilities. Embodiments recognize the scenario of the SIPTO above RAN and/or SIPTO at local network, perhaps with standalone combined gateway. Embodiments contemplate that it may be useful to provide support of/for LIPA/SIPTO
(Continued)

at a local network with a collocated gateway in a dual connectivity mode, among other scenarios. Embodiments also contemplate the usefulness for providing the capability of supporting the dual connectivity operation in multiple scenarios.

20 Claims, 13 Drawing Sheets

(51) Int. Cl.
*H04W 76/15* (2018.01)
*H04W 76/12* (2018.01)
*H04W 84/04* (2009.01)
*H04W 24/02* (2009.01)
*H04W 88/06* (2009.01)
*H04W 88/16* (2009.01)
*H04W 8/08* (2009.01)
*H04W 36/28* (2009.01)
*H04W 80/04* (2009.01)
*H04W 16/32* (2009.01)
*H04W 36/00* (2009.01)

(52) U.S. Cl.
CPC ............ *H04W 76/15* (2018.02); *H04W 8/082* (2013.01); *H04W 16/32* (2013.01); *H04W 24/02* (2013.01); *H04W 36/0069* (2018.08); *H04W 36/28* (2013.01); *H04W 80/04* (2013.01); *H04W 84/045* (2013.01); *H04W 88/06* (2013.01); *H04W 88/16* (2013.01)

(58) Field of Classification Search
CPC ... H04W 36/28; H04W 84/045; H04W 88/06; H04W 88/10; H04W 88/16; H04W 8/082; H04W 36/22; H04W 74/0833; H04W 80/04; H04W 72/082; H04W 72/1215; H04W 92/02; H04W 16/14
See application file for complete search history.

(56) References Cited

U.S. PATENT DOCUMENTS

| | | | | |
|---|---|---|---|---|
| 2012/0082090 | A1* | 4/2012 | Horn | H04W 76/10 370/328 |
| 2013/0003698 | A1 | 1/2013 | Olvera-Hernandez et al. | |
| 2015/0071210 | A1* | 3/2015 | Huang | H04W 8/26 370/329 |
| 2016/0183156 | A1* | 6/2016 | Chin | H04W 36/0022 370/331 |
| 2016/0309319 | A1* | 10/2016 | Gao | H04W 8/082 |

FOREIGN PATENT DOCUMENTS

| | | |
|---|---|---|
| WO | WO 2012/177023 A1 | 12/2012 |
| WO | WO 2013/019035 A2 | 2/2013 |
| WO | WO 2015021597 A1 * | 8/2013 |

OTHER PUBLICATIONS

3rd Generation Partnership Project (3GPP), R3-131440, "LIPA/SIPTO Support in the Small Cell", Samsung, 3GPP TSG-RAN WG3 Meeting #81, Barcelona, Spain, Aug. 19-23, 2013, 2 pages.

3rd Generation Partnership Project (3GPP), R3-140256, "LIPA/SIPTO Support in Dual Connectivity (SA2 point 9)", Alcatel-Lucent, 3GPP TSG-RAN WG3 Meeting #83, Prague, Czech Republic, Feb. 10-14, 2014, 5 pages.

3rd Generation Partnership Project (3GPP), TD S2-096638, "One SGW based Architecture and Solution for LIPA_SIPTO", ZTE, 3GPP TSG SA WG2 Meeting #76, Cabo, Mexico, Nov. 16-20, 2009, pp. 1-4.

3rd Generation Partnership Project (3GPP), TD S2-102191, "Procedural Impacts Related to Session Management Required to Support LIPA Traffic for Solution 1", Qualcomm, 3GPP TSG SA WG2 Meeting #79, Kyoto, Japan, May 10-14, 2010, 9 pages.

3rd Generation Partnership Project (3GPP), TR 36.842 V12.0.0, "Technical Specification Group Radio Access Network, Study on Small Cell Enhancements for E-UTRA and E-UTRAN, High Layer Aspects (Release 12)", Dec. 2013, pp. 1-71.

$3^{rd}$ Generation Partnership Project (3GPP), S2-140175, "System impact for "Small Cell Enhancement" work in RAN", Huawei, Hisilicon, SA WG2 Meeting #101, Taipei, Taiwan, Jan. 20-24, 2014, pp. 5.

$3^{rd}$ Generation Partnership Project (3GPP), S2-140537, "LS on system aspects for Small Cell Enhancement work in RAN", SA2, 3GPP TSG-SA WG2 Meeting # 101, Taipei, Taiwan, Jan. 20-24, 2014, pp. 4.

$3^{rd}$ Generation Partnership Project (3GPP), RP-132069, "New Work Item Description: Dual Connectivity for LTE—Performance Part", NTT DOCOMO,Inc., NEC Corporation, 3GPP TSG-RAN Meeting #62, Busan, Korea, Dec. 3-6, 2013, pp. 4.

$3^{rd}$ Generation Partnership Project (3GPP), RP-132069, "New Work Item Description: Dual Connectivity for LTE—Core Part", NTT DOCOMO,Inc., NEC Corporation, 3GPP TSG-RAN Meeting #62, Busan, Korea, Dec. 3-6, 2013, pp. 6.

$3^{rd}$ Generation Partnership Project (3GPP), RP-132069, "New Work Item Description: Dual Connectivity for LTE", NTT DOCOMO,Inc., NEC Corporation, 3GPP TSG-RAN Meeting #62, Busan, Korea, Dec. 3-6, 2013, pp.

3rd Generation Partnership Project (3GPP), TR 23.859 V12.0.1, "Technical Specification Group Services and System Aspects, Local IP access (LIPA) Mobility and Selected IP Traffic Offload (SIPTO) at the Local Network (Release 12)", Apr. 2013, 13 pages.

* cited by examiner

"3C" with Bearer split

LOCAL OFFLOAD AND SMALL CELL ARCHITECTURE (SCA)

CROSS-REFERENCE TO RELATED APPLICATIONS

This application is the National Stage Entry under 35 U.S.C. § 371 of Patent Cooperation Treaty Application PCT/US2015/020459, titled "Local Offload and Small Cell Architecture (SCA)", filed Mar. 13, 2015, which claims the benefit of U.S. Provisional Patent Application No. 61/952,859, titled "Local Offload and Small Cell Architecture (SCA)", filed Mar. 13, 2014, the contents of all of which are incorporated by reference as if fully set-forth herein in their respective entirety, for all purposes.

BACKGROUND

Small cell architectures may include low-powered radio access nodes that operate in licensed and unlicensed spectrum that have may somewhat modest range relative to more highly powered radio access nodes. Small cell nodes are "small" as compared to mobile macro-cells, which may have a range of tens of kilometers. Small cells provide a small radio footprint, which can range from meters to kilometers.

Small cells include femtocells, picocells, and/or microcells. Small-cell networks can be realized using distributed radio technology that may include centralized baseband units and remote radio heads. Small cells may be centrally managed by mobile network operators.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments contemplate that one or more default and/or dedicated bearers of the same packet data network (PDN) connection may be served by one or more different cells. For example, dedicated bearer of PDN connection "1" with QoS requirement may be served by the MeNB whereas the default bearer may be served by the SeNB. A bearer specific X2 path switch request and/or a SeNB addition/modification procedure may be used for switching these bearers to the SeNB.

Embodiments contemplate that the network could use a "Connectivity Type" IE in the ACTIVATE DEFAULT BEARER CONTEXT REQUEST message to indicate that a PDN connection may be a Local IP Access and/or Selected IP Traffic Offload (LIPA/SIPTO) connection (e.g., where in some embodiments it may be useful to go through a SeNB). In some embodiments, the identification of the SeNB (e.g. Cell_ID) corresponding to this PDN connection can be sent to the wireless transmit/receive unit (WTRU) (or User Equipment (UE)) in the same message.

Embodiments contemplate that the WTRU may report the availability of the SeNB to the MeNB (e.g., in RRC measurement report messages). The MeNB may remove the SeNB from the SCG and/or request the SeNB to release the Radio Bearer, perhaps for example if the SeNB may unavailable, among other scenarios.

Embodiments contemplate that the MeNB may provide at least one SIPTO LGW IP address in the S1AP initial message. The MeNB may indicate that a LGW IP address may be provisional, perhaps for example when one LGW IP address may be provided, among other scenarios.

Embodiments contemplate that the MeNB may inform the MME of the S1-U transport address and/or TEIDs of the SeNB for the offloaded bearers, perhaps for example when a small cell ("S-cell", which may be used herein interchangeably with "SeNB") may be configured for the WTRU, among other scenarios. Information may include an serving gateway (SGW) IP address of the SeNB, perhaps for example if the configured SeNB may support SIPTO with collocated LGW, and/or if the offloaded bearer may include the correlation ID.

Embodiments contemplate a small cell evolved NodeB device (SeNB) that may comprise a processor. The processor may be configured to determine an Internet Protocol (IP) address for a local gateway (LGW). The LGW may be associated with the SeNB. The processor may be configured to assign the IP address to the LGW. The processor may be configured to receive a request to communicate at least one of: a local IP access (LIPA) communication or a selected IP traffic offload (SIPTO) communication. The processor may be configured to send the LGW IP address to a macro evolved NodeB (MeNB) upon at least one of: an association with the LGW or the receipt of the request. The SeNB may be in dual connectivity with the MeNB. The processor may be configured to communicate the at least one of: the local Internet Packet (IP) access (LIPA) communication or the selected IP traffic offload (SIPTO) communication.

Embodiments contemplate a wireless transmit/receive unit (WTRU) that may comprise a processor. The processor may be configured to establish a packet data network (PDN) connection via a small cell evolved NodeB (SeNB) for at least one of: a local Internet Packet (IP) access (LIPA) communication or a selected IP traffic offload (SIPTO) communication. The processor may be configured to receive an uplink (UL) data request upon a transition from an idle mode. The processor may be configured to determine that the UL data request may be for at least one of the LIPA communication or the SIPTO communication. The processor may be configured to determine an opportunity to communicate with the SeNB. The processor may be configured to initiate a random access channel (RACH) procedure with the SeNB upon an occurrence of the opportunity. The processor may be configured to synchronize with the SeNB upon a successful RACH procedure. The processor may be configured to send at least one of: the LIPA communication or the SIPTO communication via the SeNB in response to the UL data request.

Embodiments contemplate a system that may comprise a macro evolved NodeB device (MeNB). The MeNB may comprise a first processor. The first processor may be configured to send one or more local gateway (LGW) Internet Protocol (IP) addresses to a mobility management entity device (MME). The first processor may be configured to receive a context request from a wireless transmit/receive unit (WTRU). The context request may include a LGW IP address. The MME may comprise a second processor. The second processor may be configured to determine at least one of an existence or a non-existence of a corresponding LGW IP address between the LGW IP address and the one or more LGW IP addresses. The second processor may be configured to, upon determining the existence of the corresponding LGW IP address, send at least one of: the corresponding LGW IP address or a correlation identification to the MeNB. The second processor may be configured to, upon determining the non-existence of the corresponding LGW IP address, perform at least one of: deactivate a selected IP traffic offload (SIPTO) packet data network (PDN) connection or re-activate the SIPTO PDN connection.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to be exemplary and in no way limit the scope of the application. As used herein, the articles "a" and "an", absent further qualification or characterization, may be understood to mean "one or more" or "at least one", for example.

Figure 1A:
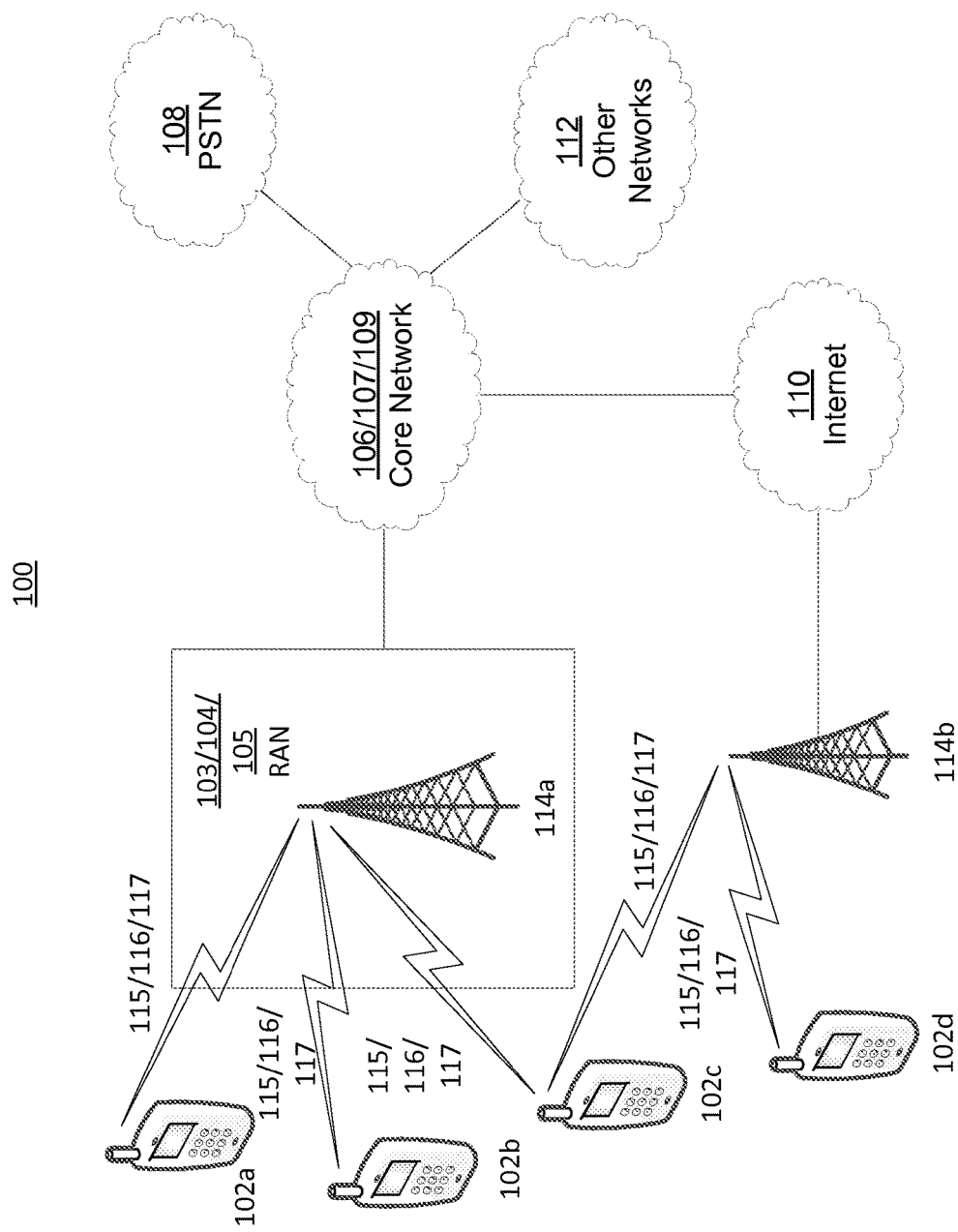
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
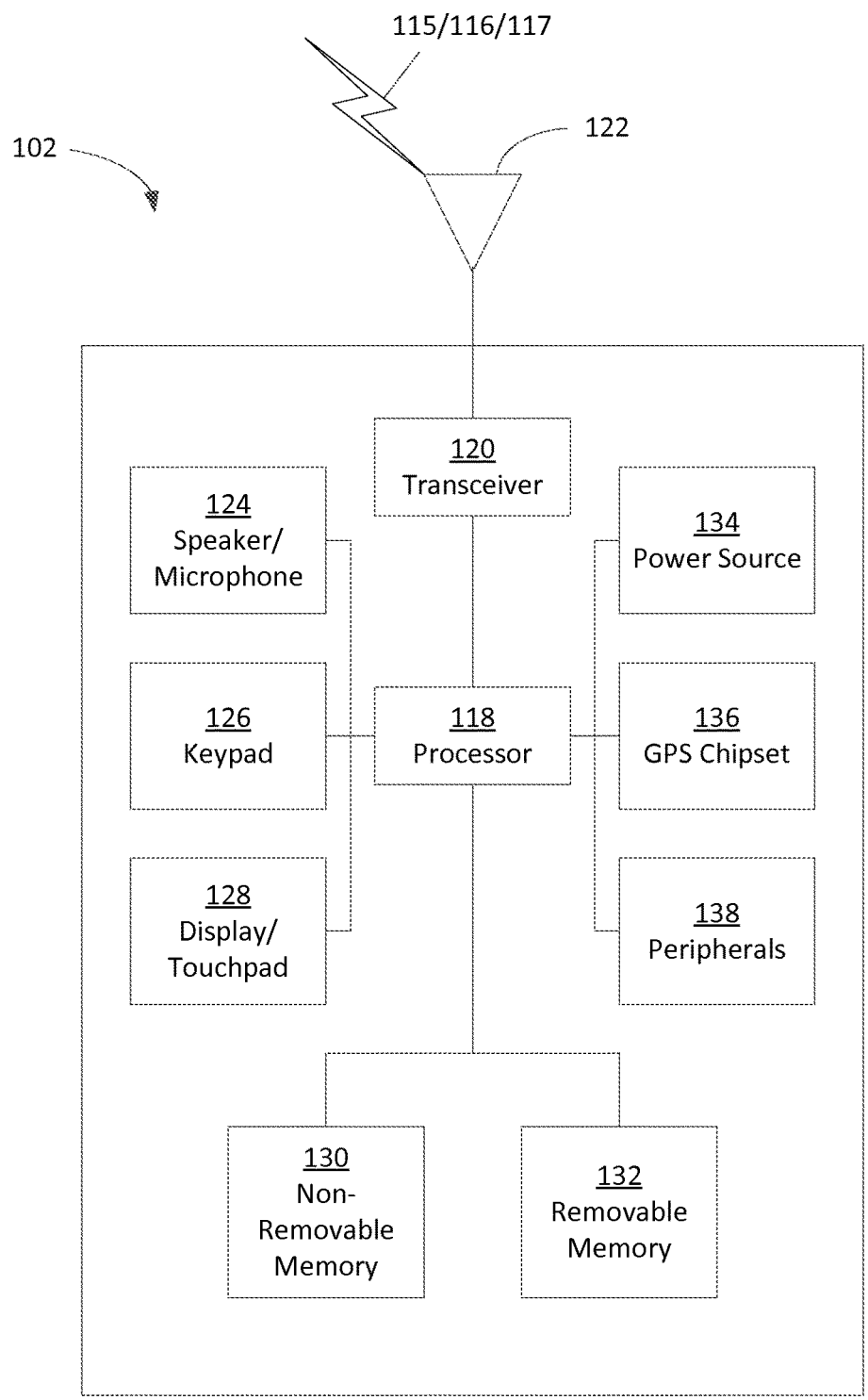
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown). 1 SEQ PTO \# "[000#]"\*MERGEFORMAT The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
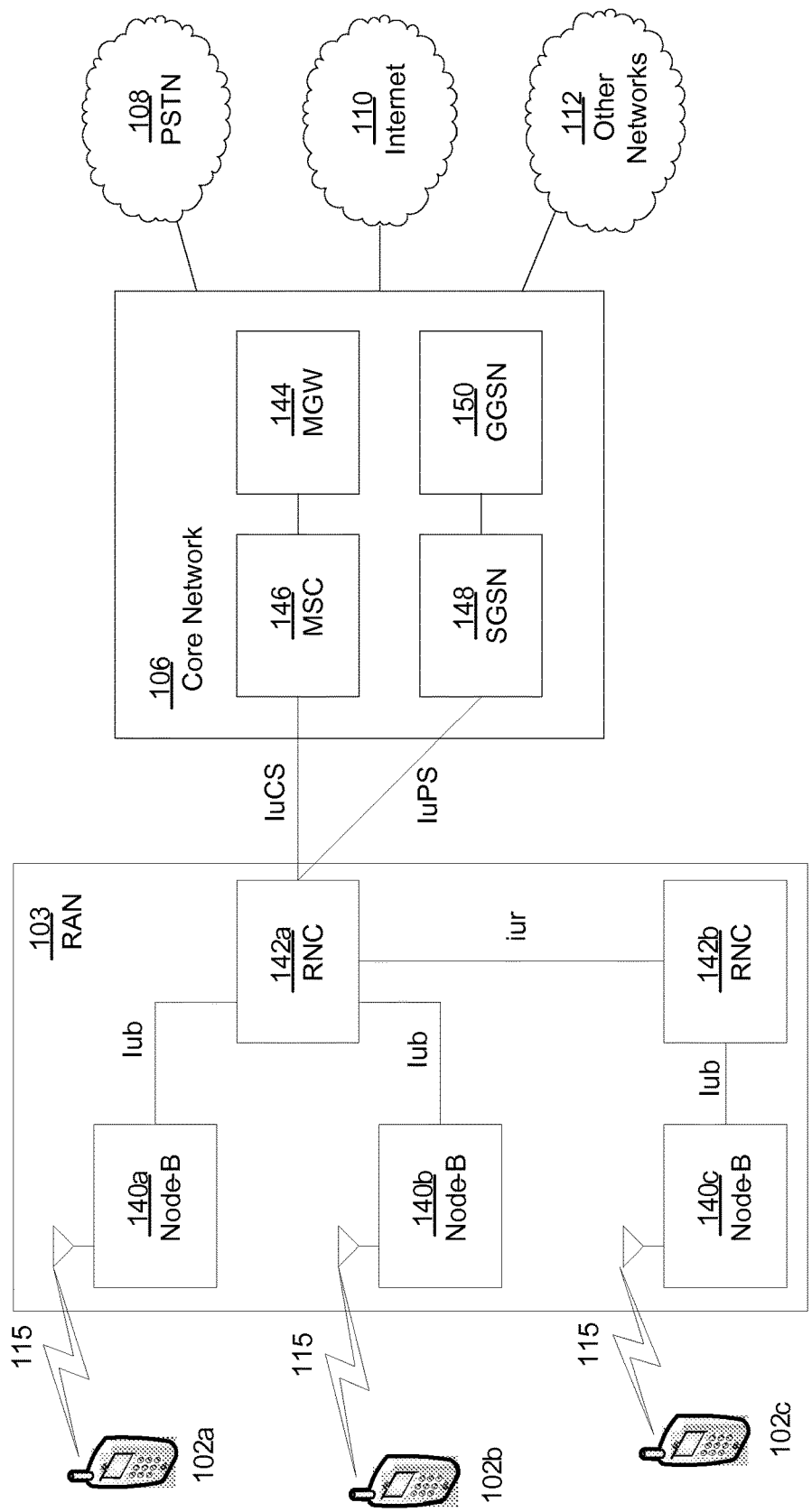
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
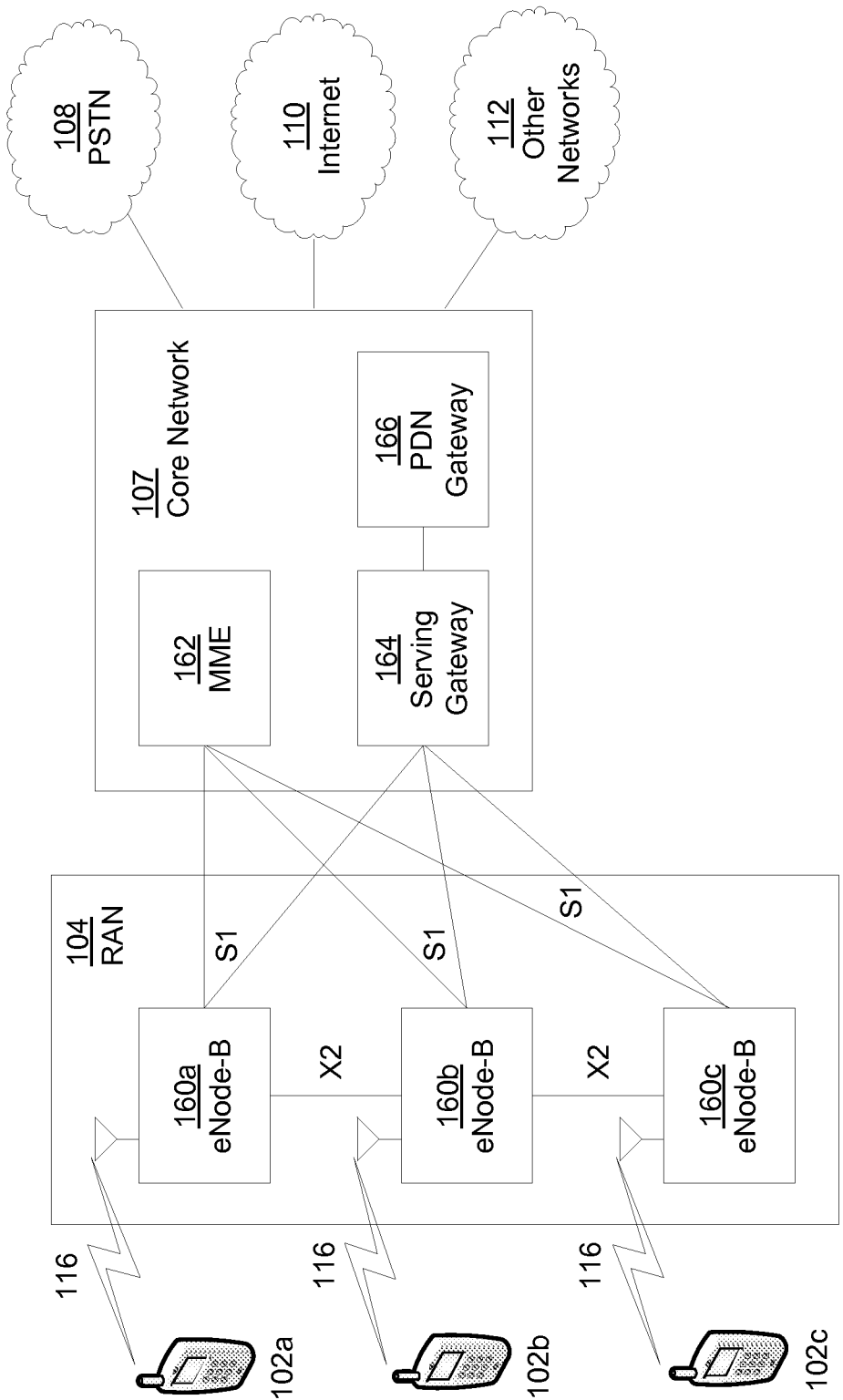
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
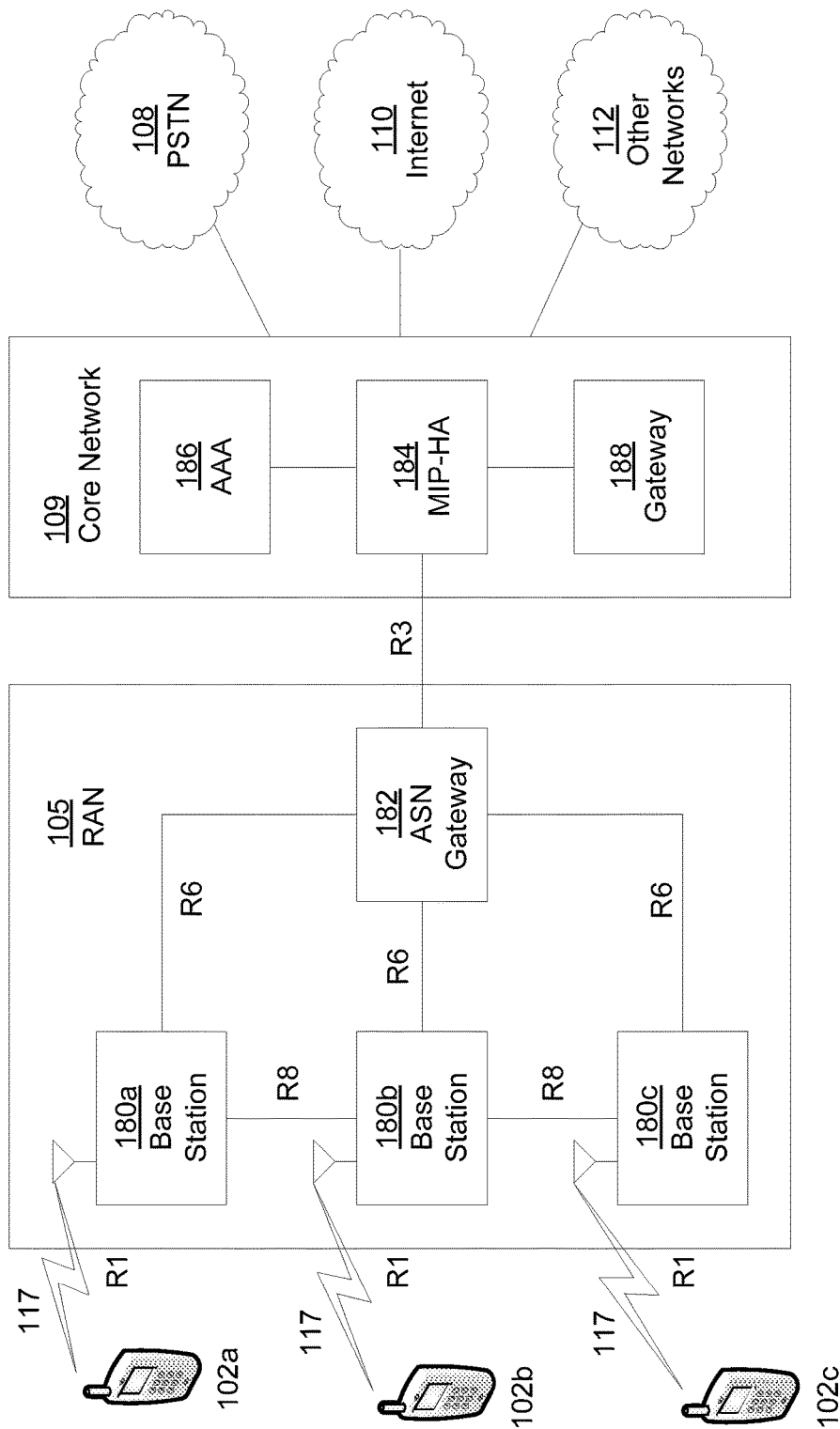
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

In view of FIGS. 1A-1E, and the corresponding description of FIGS. 1A-1E, one or more, or all, of the functions described herein with regard to one or more of: WTRU 102*a-d*, Base Station 114*a-b*, Node B 140*a-c*, RNC 142*a-b*, MSC 146, SGSN 148, MGW 144, CGSN 150, eNode-B 160*a-c*, MME 162, Serving Gateway 164, PDN Gateway 166, Base Station 180*a-c*, ASN Gateway 182, AAA 186, MIP-HA 184, and/or Gateway 188, or the like, may be performed by one or more emulation devices (not shown) (e.g., one or more devices configured to emulate one or more, or all, of the functions described herein).

The one or more emulation devices may be configured to perform the one or more, or all, functions in one or more modalities. For example, the one or more emulation devices may perform the one or more, or all, functions while being fully or partially implemented/deployed as part of a wired and/or wireless communication network. The one or more emulation devices may perform the one or more, or all, functions while being temporarily implemented/deployed as part of a wired and/or wireless communication network. The one or more emulation devices may perform the one or more, or all, functions while not being implemented/deployed as part of a wired and/or wireless communication network (e.g., such as in a testing scenario in a testing laboratory and/or a non-deployed (e.g. testing) wired and/or wireless communication network, and/or testing performed on one or more deployed components of a wired and/or wireless communication network). The one or more emulation devices may be test equipment.

Figure 1F:
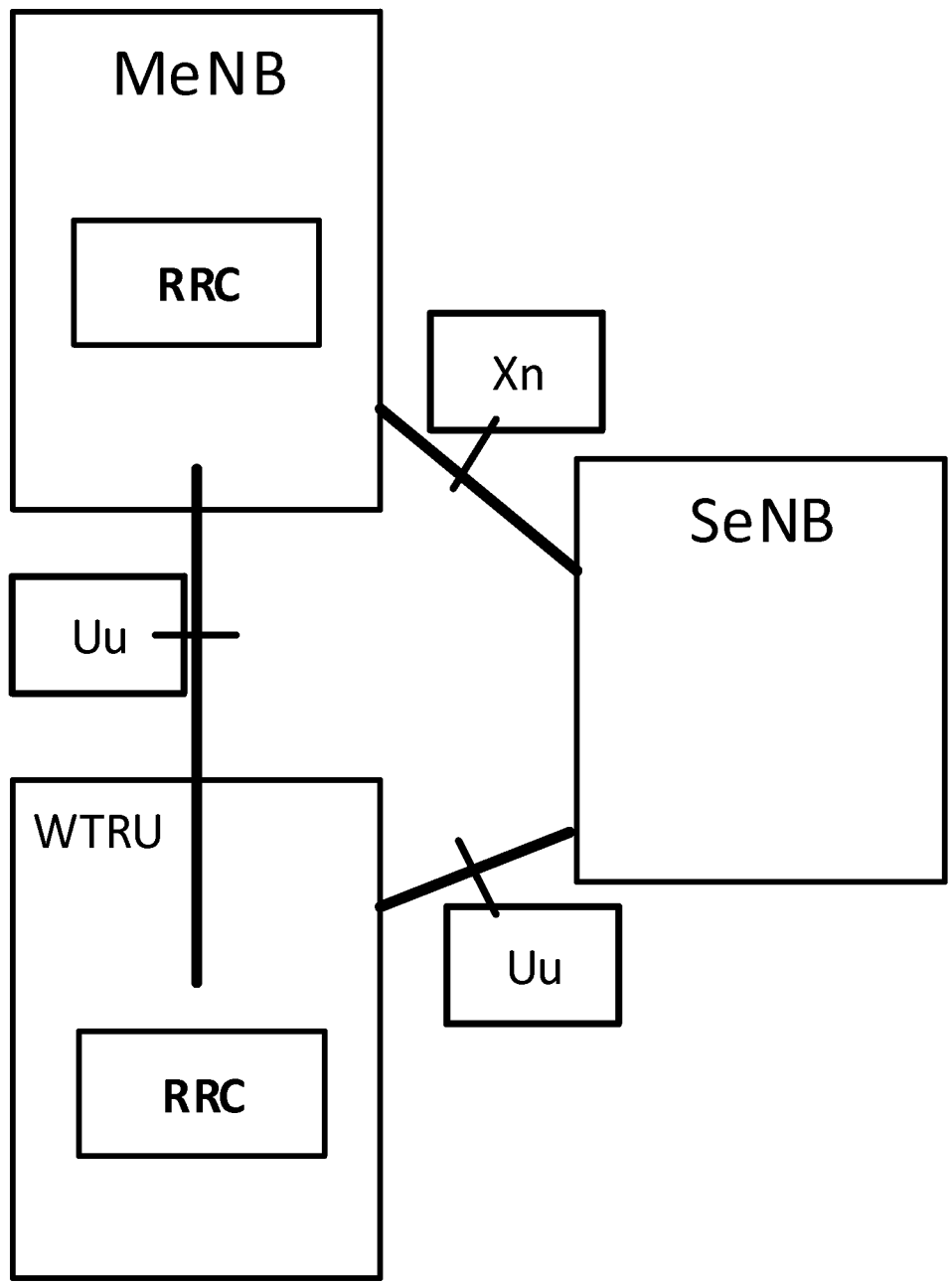
FIG. 1F is an example illustration of a control plane architecture for a small cell/dual connectivity architecture, consistent with embodiments.

Embodiments recognize 3GPP RAN group work on small cell architecture which may provide dual connectivity in LTE System (e.g., in which the WTRU may be connected to two RAN nodes/eNBs, perhaps simultaneously, such as for example a Macro eNB (MeNB) and/or a Small cell eNB (SeNB). FIG. 1F illustrates an example of a control plane architecture for a small cell/dual connectivity architecture.

A WTRU may stay in a single RRC state (e.g., an RRC_CONNECTED, an RRC_IDLE, etc.) perhaps for example in a dual connectivity operation, among other scenarios. Embodiments recognize that the MeNB (e.g., perhaps in some embodiments only the MeNB) may generate the final RRC messages to be sent towards the WTRU. The WTRU RRC entity may see one or more, or all, messages coming from at least one entity (e.g., in the MeNB, and in some embodiments perhaps only from the one entity). The WTRU may reply back to that entity (e.g., perhaps in some embodiments may reply only to that entity). The RRC messages may be transmitted from the MeNB. In some embodiments, the transmission of RRC messages via the SeNB may be supported or might not be supported. As seen in FIG. 1, there may be at least one S1-MME connection for at least one WTRU (e.g., between MeNB and MME, and perhaps in some embodiments there may be only one S1-MME connection for one WTRU).

Figure 2:
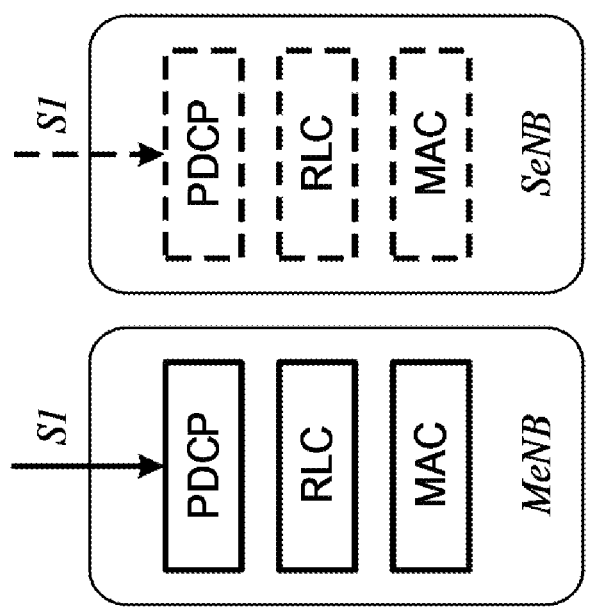
FIG. 2 is an illustration of an example of two user plane architectures for small cell/dual cell connectivity, consistent with embodiments.
Figure 2:
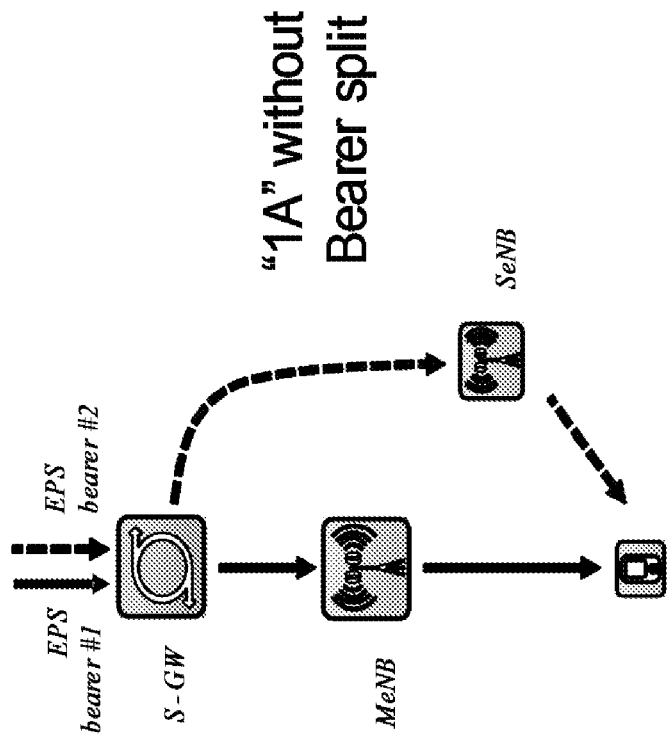
Figure 3:
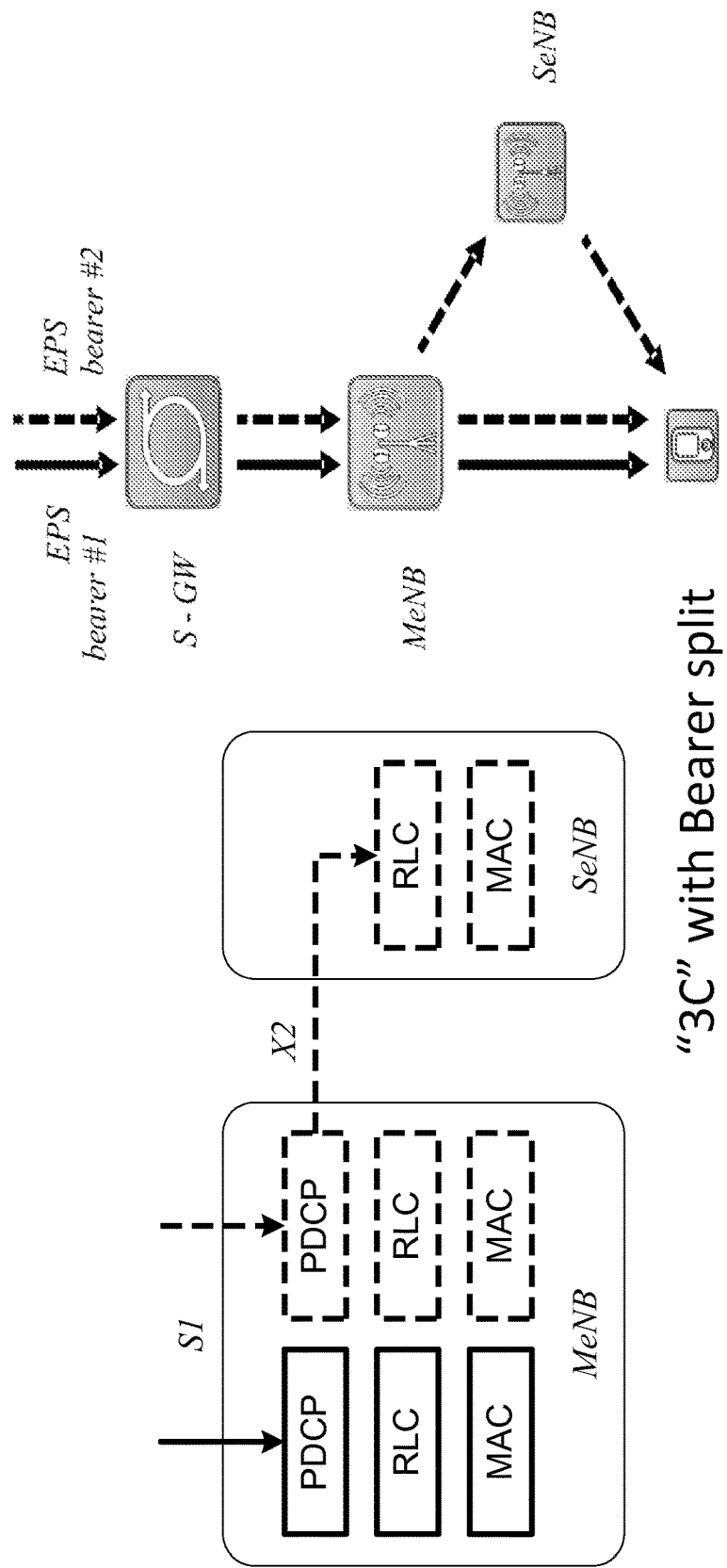
FIG. 3 is an illustration of an example of two user plane architectures for small cell/dual cell connectivity, consistent with embodiments.

Embodiments recognize one or more user plane architectures (e.g., at least two different) that may be useful for small cell/dual cell connectivity. FIG. 2 and FIG. 3 illustrate respective examples of small cell user plane architectures.

Embodiments contemplate that dual connectivity operation, signaling, and/or protocol support for dual connectivity may include one or more reconfigurations involving the architecture of FIG. 2 (e.g., "1A") and/or the architecture of FIG. 3 (e.g., "3C").

Embodiments contemplate that, for example in FIG. 2, one or more, or all, of the S1-U tunnels may terminate in the SeNB. In some embodiments, there might not be any bearer split across MeNB and SeNB for a bearer (e.g. a same bearer). Embodiments also contemplate that, for example in FIG. 3, the S1-U may terminate in the MeNB (e.g., perhaps in some embodiments the S1-U may only terminate in the MeNB). One or more, or all, of the bearers may split across MeNB and/or SeNB.

Figure 4:
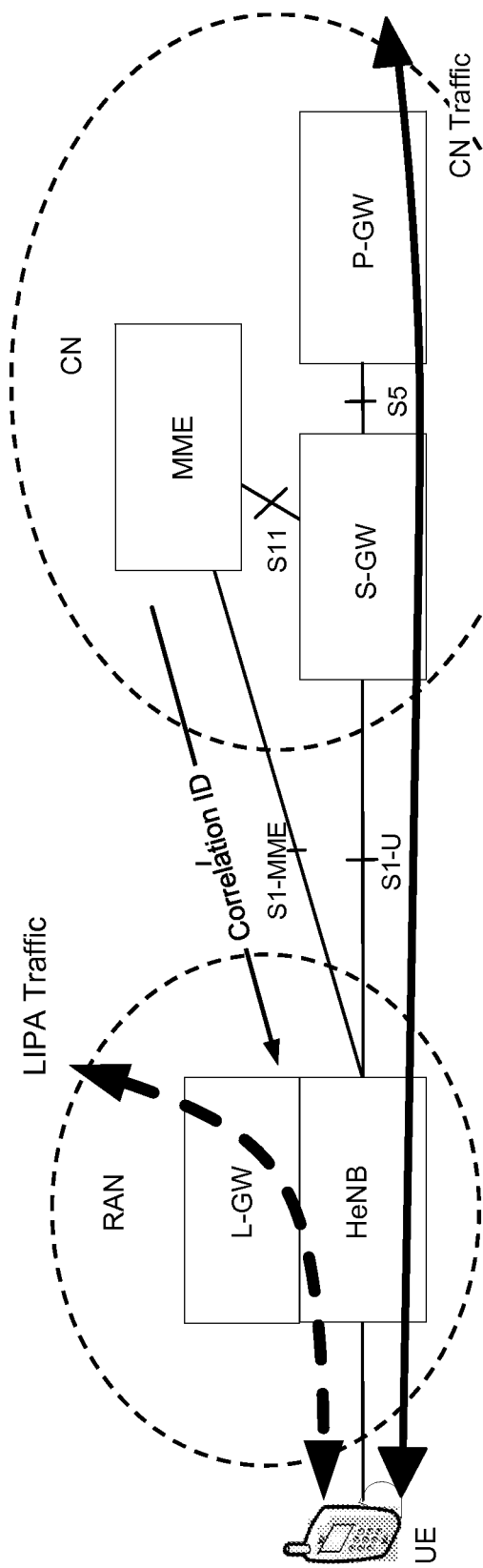
FIG. 4 is an illustration of an example of an LIPA architecture with an L-GW collocated with a HeNB, consistent with embodiments.

Embodiments contemplate LIPA/SIPTO. Embodiments recognize the introduction of (e.g., in 3GPP R10) the concept of local gateway/local PDN Gateway (L-GW or LGW). L-GW may allow the traffic to be routed (e.g., directly) to the local network via PDN connection a local network (e.g., a home and/or enterprise, among the like). FIG. 4 illustrates an example of an LIPA architecture with L-GW collocated with HeNB.

In FIG. 4, the MME may send a correlation ID to the HeNB in an S1-AP message, for example perhaps during the setup of at least one LIPA/SIPTO bearer, among other scenarios. The correlation ID may be used by the HeNB, which may determine the uplink traffic path, perhaps based on the correlation ID. In FIG. 4, the double-arrowed solid line traffic (e.g., no Correlation ID) may be sent to CN and/or the double-arrowed dotted-line traffic (e.g., HeNB has Correlation ID) may be sent towards the LN. This architecture may be used to route traffic to the internet through the local network, for example by having a SIPTO@Localnetwork PDN connection, among other scenarios. A Correlation ID is an identity parameter that may be used in LIPA/SIPTO at Local Network, for example by the eNB, perhaps to determine if the uplink user plane path for one or more associated bearers may be steered directly towards a Local Gateway. In some embodiments, the Correlation ID may be sent to a user plane PDN GW TEID, perhaps instead of being routed through (e.g., a normal) EPC path via SGW, among other scenarios.

Figure 5:
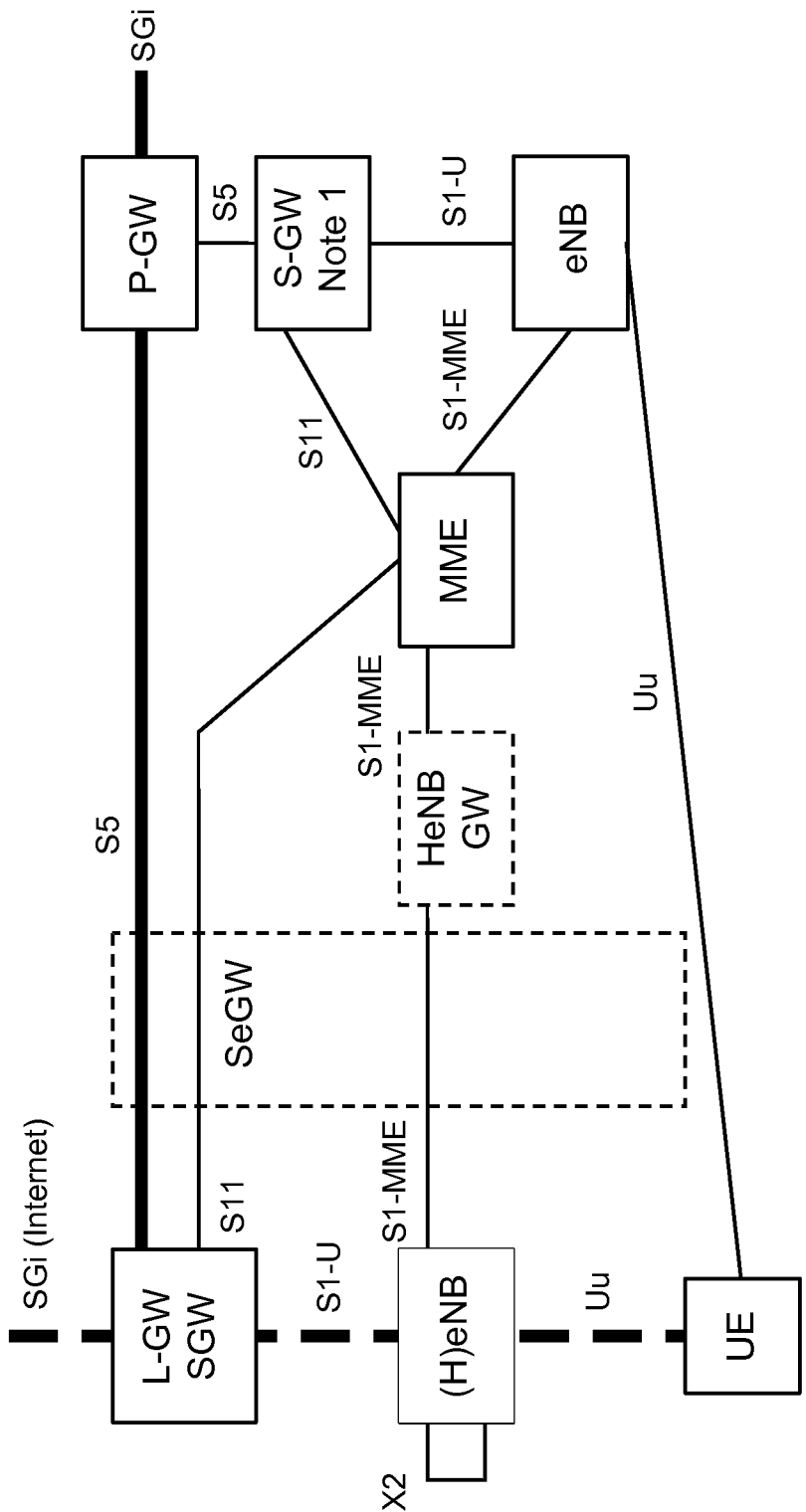
FIG. 5 is an illustration of an example of an architecture including an S-GW collocated with an L-GW, consistent with embodiments.

Embodiments recognize (e.g., in 3GPP R12) the introduction of a standalone L-GW. FIG. 5 illustrates an example of a standalone L-GW in which an S-GW may be collocated with the L-GW. This architecture may support a SIPTO@LN PDN connection in the standalone L-GW architecture, for example, among other scenarios.

In FIG. 5, the S-GW may be relocated to the L-SGW, perhaps for example when the local PDN may be initiated, among other scenarios. In some embodiments, the HeNB might not differentiate the local traffic (arrowed dotted-line traffic) from the Core Network (CN) traffic, perhaps for example because some, or all, of the user plane traffic may go through the L-SGW, among other reasons. In such scenarios, among others, no correlation ID may be useful in this architecture.

Figure 6:
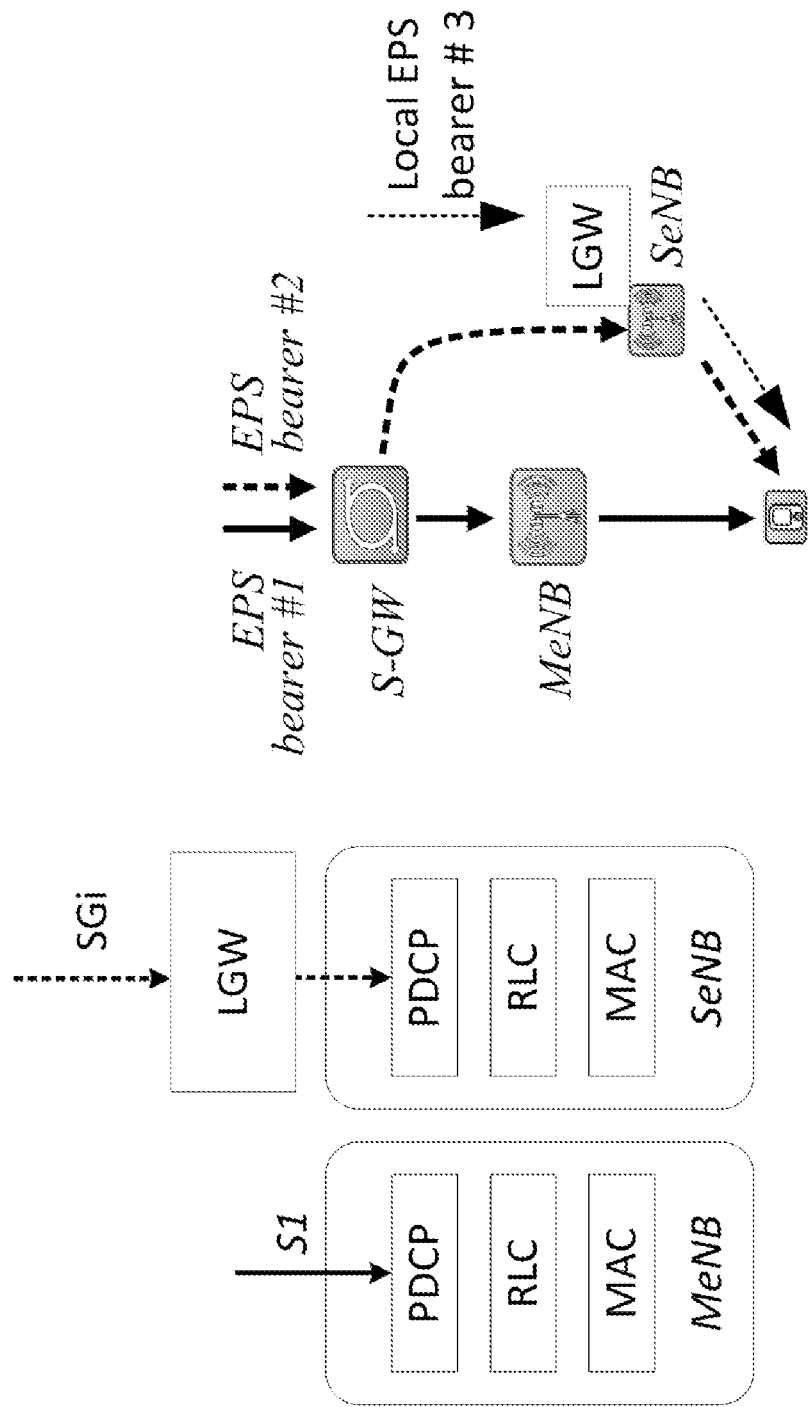
FIG. 6 is an illustration of example of an architecture including an LIPA/SIPTO feature, consistent with embodiments.

Embodiments contemplate activation of LIPA/SIPTO in a Small Cell Architecture (SCA). Embodiments contemplate small cell enhancement for dual connectivity operation and/or the impact of such enhancement for the support of the example LIPA/SIPTO architecture illustrated in FIG. 6. In FIG. 6, the L-GW shown could be a collocated L-GW and/or a standalone L-GW with S-GW capabilities (not shown). Embodiments recognize the scenario of the SIPTO above RAN and/or SIPTO at local network, perhaps with standalone combined gateway. Embodiments contemplate that it may be useful to provide support of/for LIPA/SIPTO at a local network with a collocated gateway in a dual connectivity mode, among other scenarios. Embodiments also contemplate the usefulness for providing the capability of supporting the dual connectivity operation in multiple scenarios.

For example, embodiments contemplate one or more of: LIPA/SIPTO at local network with collocated LGW at SeNB, LIPA/SIPTO at local network with collocated LGWs (at MeNB and/or SeNB); and/or LIPA at local network using a standalone LGW, among other scenarios.

Embodiments contemplate the enablement of LIPA/SIPTO at local network in dual connectivity mode. Embodiments contemplate LIPA identification and/or Correlation ID in SeNB. Embodiments contemplate techniques to provide the MeNB with information regarding a LGW that may be connected to SeNB, and/or to send such information to the MME to inform about the identity of the LGW, among other reasons. Embodiments contemplate techniques to provide the SeNB with the Correlation ID. Embodiments contemplate techniques for providing/determining the value of Correlation ID set.

Embodiments contemplate one or more techniques for WTRU access for LIPA/SIPTO traffic. Embodiments contemplate one or more triggers for providing WTRU access the network, perhaps in some embodiments assuming that the WTRU may have established the PDN connection for the LIPA/SIPTO traffic over SeNB, among other scenarios. Embodiments contemplate one or more of the following triggers that may make it useful for the WTRU access the network:
  the WTRU may have a UL transmission request for non-LIPA/SIPTO traffic;
  the WTRU may have a UL transmission request for LIPA/SIPTO traffic;
  the WTRU may have received a paging caused by non-LIPA/SIPTO downlink traffic; and/or
  The WTRU may have received a paging caused by LIPA/SIPTO downlink traffic.

Embodiments contemplate one or more techniques for WTRU to access the network, perhaps for example in scenarios in which the LIPA/SIPTO can go through the SeNB in which the co-located L-GW may reside and/or with which the standalone L-GW/SGW may be connected, among other scenarios. For example, the WTRU may ensure that it can be served by the SeNB, perhaps for example before it may make an RRC connection with MeNB (e.g., for example in scenarios where the access may be triggered by the LIPA/SIPTO traffic, among other scenarios).

Embodiments contemplate one or more of the following techniques for scenarios that may include Dual Connectivity and/or LIPA/SIPTO:
  One or more techniques for the WTRU to access the network, including one or more considerations that may be useful perhaps for example if the access may be triggered by the LIPA/SIPTO traffic, among other scenarios;
  One or more techniques that the WTRU may use to discover whether it can be served by the SeNB, perhaps for example if the access may be triggered by the LIPA/SIPTO traffic, among other scenarios;
  One or more techniques for determining the usefulness of differentiating and/or differentiating the paging for LIPA/SIPTO downlink traffic from the paging for non-LIPA/SIPTO traffic; and/or
  One or more techniques that may prevent repeated paging, perhaps for example if the paging for LIPA/SIPTO may fail (e.g., due to the unavailability of the SeNB), among other scenarios.

Embodiments contemplate Idle to connected mode transition. In some embodiments, the SIPTO feature may be transparent to a WTRU. Embodiments contemplate one or more techniques that may facilitate a WTRU request for RRC connection to MeNB, perhaps for example due to a MO and/or MT traffic, and/or perhaps for example if a WTRU may have previously established a SIPTO PDN connection with a SeNB under a MeNB, and/or if the WTRU may transition to EMM_IDLE, among other scenarios.

The MeNB may not be aware that the WTRU may have a SIPTO PDN connection with a specific SeNB, perhaps for example upon sending the S1 initial WTRU message, among other scenarios. The MeNB may not be aware that the WTRU may be under the radio coverage of a SeNB which may offer collocated SIPTO LGW, perhaps for example upon sending the S1 initial WTRU message, among other scenarios. Embodiments contemplate techniques that may determine the LGW address which the MeNB can include in the S1 message.

Embodiments contemplate that the MME may compare the LGW IP address in the WTRU context with the LGW IP address from an eNB in the initial S1 message. The MME may signal to the WTRU to deactivate and/or re-activate the SIPTO PDN connection, perhaps for example if the address may be missing in S1AP message and/or might not be the same as the one in the context, among other scenarios. A WTRU's existing SIPTO PDN connection may be deactivated and/or reactivated again in one or more, or every, idle-to-connected transition, perhaps for example if the MeNB may include a different LGW IP address (e.g., perhaps due to multiple SeNBs connected to MeNB offering such functionality) than the one in the WTRU context, and/or perhaps if the MeNB might not include an LGW IP address (e.g., perhaps because the MeNB might not be certain that the WTRU may be in any SeNB coverage), among other scenarios.

Embodiments contemplate LIPA/SIPTO activation and/or deactivation. In some embodiments, the RAN node (e.g., the MeNB) may move certain bearers from the MeNB to the SeNB and/or vice versa. The MeNB may do this for the LIPA/SIPTO PDN connection, perhaps for example based on one or more triggers as described herein.

The MME may inform the MeNB during the establishment of the PDN connection that the PDN connection may be for the LIPA PDN with a SeNB that may be connected to the L-GW, perhaps for example when the WTRU may send a request for an LIPA PDN connection with a specific LIPA indication in the PDN connection request to the MME, among other scenarios. This indication could be in the form of a correlation ID which may be sent by the MME to the MeNB, perhaps for example in the case of a collocated L-GW and SeNB and/or an indication in the downlink S1-AP message which may inform the MeNB that the PDN connection is being established for an LIPA traffic. The MeNB may decide to offload/handover such a bearer(s) to the SeNB that may be connected to the LGW, perhaps for example during the establishment of such PDN connection and/or perhaps after the LIPA PDN connection may have been established, among other scenarios.

In some embodiments, the WTRU may perform a handover to the MeNB that may be connected to the small cell eNB, for example with an LGW connection. The MeNB may decide to handover one or more, or all, the bearers which might not have the QoS requirement to the SeNB with the L-GW. One or more default bearers and/or bearers with QCI 8 and/or QCI 9 may be offloaded to the SeNB, perhaps for example when the L-GW might not support the provision of QoS for the Evolved Packet System (EPS) bearers, among other scenarios. Default and/or dedicated bearer(s) of the same PDN connection may be served by different cells (e.g., dedicated bearers of PDN connection "1" with QoS requirement served by the MeNB, whereas the default bearer may be served by the SeNB. A bearer specific X2 path switch request and/or SeNB addition/modification procedure may be used for switching one or more of these bearers to the SeNB. The MME and/or the S-GW may ensure that the connections might not exceed the allocated APN_AMBR, for example.

In some embodiments, one or more, or all, the small cells might not be connected to the L-GW (e.g., collocated with SeNB and/or standalone L-GW). The MeNB may decide to offload one or more bearers to the L-GW, perhaps for example via a SIPTO@LN PDN connection, perhaps as soon as the WTRU may move into the coverage of the SeNB which may be connected to the LGW, among other scenarios.

The MeNB may give priority to the SeNB(s) which may be connected to the L-GW over the SeNBs which might not have coverage, perhaps for example when the WTRU may be under the coverage of multiple SeNBs, among other scenarios. This may offload RAN resources and/or network resources to the SeNB system with L-GW connectivity.

Embodiments contemplate LIPA Identification and/or Correlation ID in Dual Cell Scenario. LIPA may be established by the WTRU, perhaps for example with an authorization subscription requesting a new (e.g., fresh or updated) PDN connection to an APN for which LIPA may be permitted (e.g., per a closed subscriber group (CSG)).

The MeNB can assign an IP address to the LGW and/or may transfer it to the MME. The MME may forward the received collocated LGW IP address to the SGW, perhaps to establish one or more LGW-S5 tunnels, among other reasons. In some embodiments, the same IP address as that of the MeNB may be assigned to the LGW, perhaps for example such that the S1 IPSEC tunnel may be reused for the L-S5 interface with SGW, among other scenarios. In some embodiments, the MeNB may set up a new (e.g., fresh or updated) IPSEC tunnel for L-S5, perhaps for example if a new (e.g., fresh or updated) IP address may be assigned to LGW, among other scenarios. In some embodiments, bearer offload for a PDN connection using LIPA may be applicable to the MeNB (e.g., in some embodiments perhaps only application to the MeNB. Embodiments recognize that bearer offload to the SeNB might not be valid with at least some small cell architectures (e.g., 1A of FIG. 2), perhaps for example since there may be no user plane between MeNB and SeNB. Embodiments contemplate one or more configurations/techniques (e.g. as described herein) such that bearer offload to the SeNB might not be considered by the MeNB in such scenarios, among other scenarios.

The MeNB might not be aware of the presence of the LGW at the SeNB, perhaps for example where an LGW (e.g., perhaps only an LGW) may be collocated with SeNB, among other scenarios. The SeNB may assign an IP address to its associated LGW (e.g., in some embodiments may be same IP address as the SeNB). The MME might not use a gateway selection, perhaps for example when connectivity for an LIPA PDN may be requested by WTRU, among other scenarios. The MME may select the LGW through which the traffic may be offloaded, perhaps for example depending on subscription data, network topology, and/or load balancing, etc.

It may be useful for the MeNB to know the identities of the available pool of LGWs (e.g., perhaps for example since there may be one S1-MME interface with MeNB (e.g., MeNB-MME). Knowledge of the identities may be also be useful, perhaps for example in order to transfer the IP addresses of the LGWs to MME at one or more, or every, idle-active transition (i.e., initial WTRU message), and/or within one or more, or every, uplink NAS transport (e.g., for example when WTRU may be already connected to another PDN before requesting). The SeNB may transfer the assigned IP address of the LGW to MeNB, perhaps for example through the control plane of Xn interface involved in dual connectivity, perhaps in scenarios of LGW collocated with SeNB, among other scenarios. In some embodiments, the transfer of the IP address may be performed one or more, or all, times by default, for example on setup— perhaps whenever the SeNB may have an associated collocated LGW (e.g., whenever an HeNB subsystem may exist or be added at the SeNB). In some embodiments, the transfer of the IP address can be triggered during one or more, or every, transition from idle mode to a connected mode.

In some embodiments, the SeNB may transfer its collocated LGW IP address, for example perhaps when the MeNB and/or the SeNB may have collocated LGWs. The MME may make use of the LGW addresses of one or more, or all, available LGWs proposed/forwarded by MeNB, perhaps for example to select a given LGW for traffic offload. For example, the IP addresses of one or more, or all, the available pool of LGWs may be available and/or centralized at the MeNB, perhaps for example where it may be a network access point (e.g., perhaps in some embodiments the only such access point) that may have a connection for signaling to the MME (e.g., over S1-AP interface for one or more, or each, given WTRU).

Embodiments contemplate that user plane tunnels between selected LGW and SGW may be set up for LIPA bearers, perhaps for example even though they may be used for paging (e.g., in some embodiments perhaps used only for paging). The S5 packet data network gateway (PGW) Tunnel ID (TEID) may be set by selected LGW and/or sent to SGW (e.g., over L-S5 interface) and/or may be transferred by SGW to MME (e.g., over S11 interface), perhaps for example as part of a bearer setup in Create Session/Bearer Response messages. In some embodiments, the same TEID may be passed by MME to MeNB (e.g., over S1-AP), perhaps for example during establishment of the WTRU requested PDN connection to a LIPA PDN, and/or perhaps for example in the initial context setup request and/or E-RAB setup request messages, among other scenarios. The TEID may be used as the correlation ID by the eNB associated with the selected LGW, perhaps for example to manage the direct user plane path for offloaded traffic, among other reasons. In some embodiments, the MeNB may forward the correlation ID to the SeNB (e.g., over the control plane of Xn interface), perhaps to enable a (e.g., direct) user plane path through the selected LGW at SeNB, perhaps for example if the selected LGW may be collocated with SeNB, among other scenarios.

In some embodiments, some or all traffic may go through the L-SGW, perhaps such that the MeNB and/or the SeNB might not differentiate the local traffic from the core network traffic, perhaps for example in scenarios with standalone LGW architecture where the SGW may be collocated with LGW, among other scenarios. In some scenarios like these, among other scenarios, no correlation ID may be useful. In some embodiments, a standalone LGW may provide LIPA connectivity to one or more, or several, eNBs in the network. An LGW address that may be preconfigured in local network may be informed to the MeNB and/or SeNB, perhaps for example while eNBs may exchange their addresses with LGW, perhaps for example to establish an (e.g., direct) path between them, among other scenarios.

One or more local home network (LHN) parameters (e.g., LHN ID) may be configured at the MeNB and/or the SeNB, perhaps for example such that the one or more eNBs in the same LHN may have the same LHN ID. The LHN may be provided to the MME by the MeNB, for example perhaps over the MeNB-MME interface in one or more, or every, WTRU initial message and/or one or more, or every, uplink NAS transport control message, among other scenarios. The MME may trace if WTRU may still be in a current local home network and/or may perform appropriate gateway selection/relocation, perhaps for example based on a requested APN, LHN ID, and/or load balancing, etc.

Figure 7:
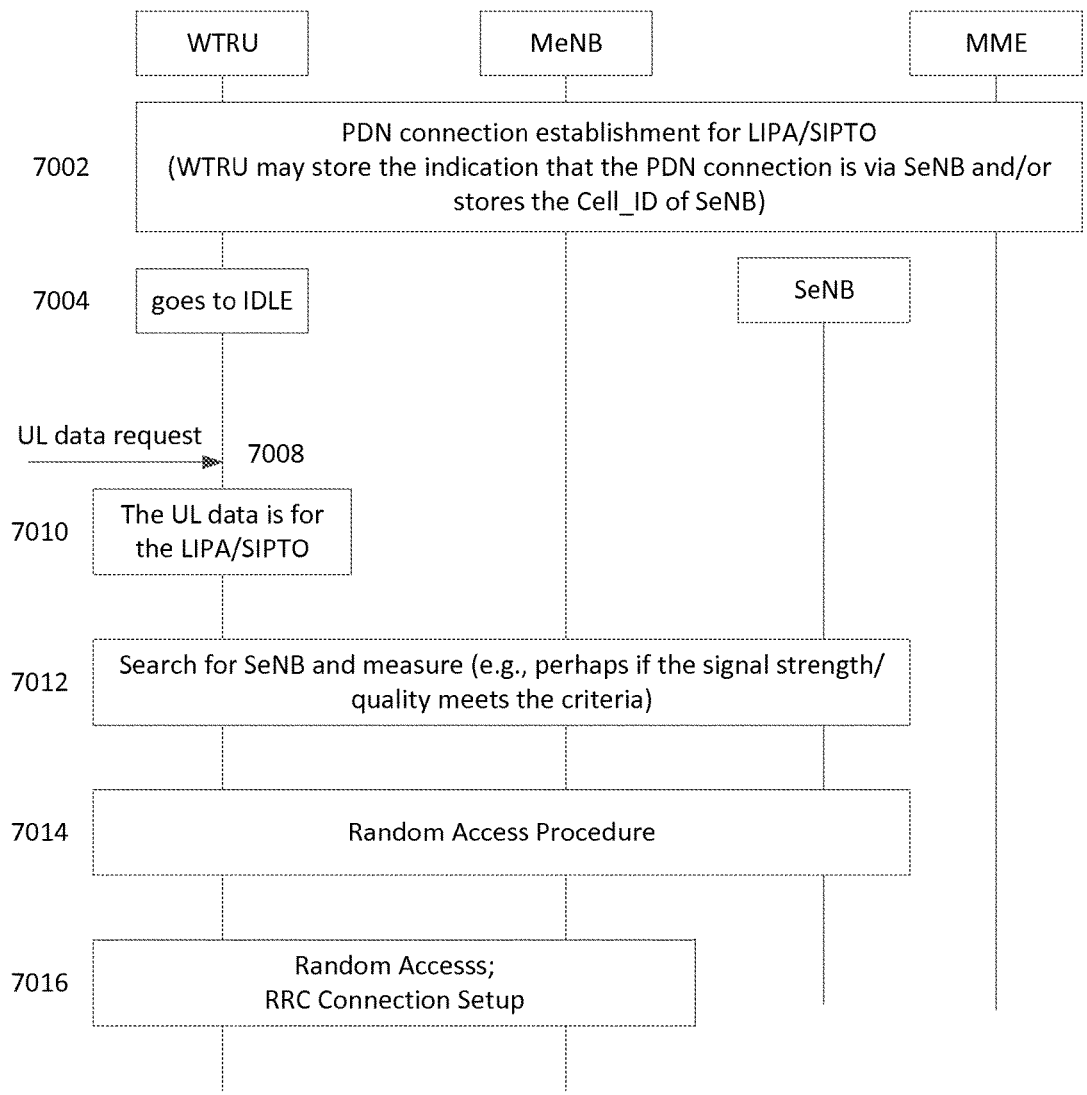
FIG. 7 is an illustration of an example technique for a wireless transmit/receive unit (WTRU or User Equipment (UE)) to access LIPA/SIPTO traffic, consistent with embodiments.

Embodiments contemplate WTRU access for LIPA/SIPTO traffic. FIG. 7 is an illustration of an example technique for a wireless transmit/receive unit (WTRU or User Equipment (UE)) to access LIPA/SIPTO traffic. The network may indicate to the WTRU that a LIPA/SIPTO connection may be bound to an SeNB, perhaps for example when a WTRU may establish a PDN connection for a LIPA/SIPTO purpose, and/or perhaps for example when the network may have selected the local GW of a SeNB (e.g., L-GW may be collocated within the SeNB, and/or the standalone L-GW/SGW may be connected with the SeNB) for this PDN connection), among other scenarios. The WTRU may store the indication that the PDN connection is via SeNB and/or may store the Cell_ID of SeNB. In some embodiments, the WTRU might not set-up an RRC connection (e.g., directly) with this SeNB. The WTRU may make an RRC connection with the corresponding MeNB (e.g., perhaps before making an RRC connection with the SeNB).

In some embodiments, the network may use the "Connectivity Type" IE in the ACTIVATE DEFAULT BEARER CONTEXT REQUEST message to indicate that a PDN connection may be a LIPA/SIPTO connection that may go through a SeNB. In some embodiments, identification of the SeNB (e.g., Cell_ID) corresponding to this PDN connection can also be sent to the WTRU (e.g., in the same message).

At 7002, a WTRU may establish a LIPA/SIPTO PDN connection (e.g., via SeNB). In other words, the WTRU may establish a packet data network (PDN) connection via a small cell evolved NodeB (SeNB) for at least one of: a local Internet Packet (IP) access (LIPA) communication or a selected IP traffic offload (SIPTO) communication. At 7004, the WTRU (e.g., in idle mode or upon a transition from the idle mode) may try to access the network and/or make RRC connection with the MeNB. The WTRU may determine if it can be served by the SeNB (e.g. may determine a service opportunity). The WTRU may be triggered to determine if it may be served by the SeNB perhaps, at 7008, receiving an uplink (UL) data request. At 7010, the WTRU may determine that the UL data request is for the LIPA/SIPTO. In other words, the WTRU may determine that the UL data request is for at least one of the LIPA communication or the SIPTO communication.

At 7012, the WTRU may search and/or find the cell corresponding to the stored Cell_ID of the SeNB. In other words, the WTRU may determine an opportunity to communicate with the SeNB. The WTRU may measure a strength of a signal from the SeNB. The WTRU may compare the strength of the signal to a threshold. The strength of the signal meeting or exceeding the threshold may indicate the occurrence of the opportunity to communicate with the SeNB. For example, the WTRU may determine that the signal strength/quality meets certain criteria (e.g., S criterion defined in TS36.304). At 7014, the WTRU may use a random access procedure (e.g. RACH) to (e.g. uplink) synchronize with the SeNB. The WTRU may send at least one of: the LIPA communication or the SIPTO communication via the SeNB in response to the UL data request. The WTRU may search for the SeNB and/or synchronize with the SeNB without communicating with and/or through the MeNB.

At 7016, the WTRU can perform a Random Access procedure with the MeNB (for example, perhaps after a successful Random Access procedure (e.g. RACH) with the SeNB at 7014). The WTRU may set up the RRC connection with the MeNB. The WTRU may indicate that it has synchronized with the SeNB and/or may provide the MeNB with the Cell_ID of the SeNB. The WTRU might not initiate the access to the MeNB, perhaps for example if the WTRU might not find the SeNB, and/or perhaps if the signal strength/quality might not meet the measurement criteria, and/or perhaps if the Random Access to the SeNB fails, among other scenarios.

Figure 8:
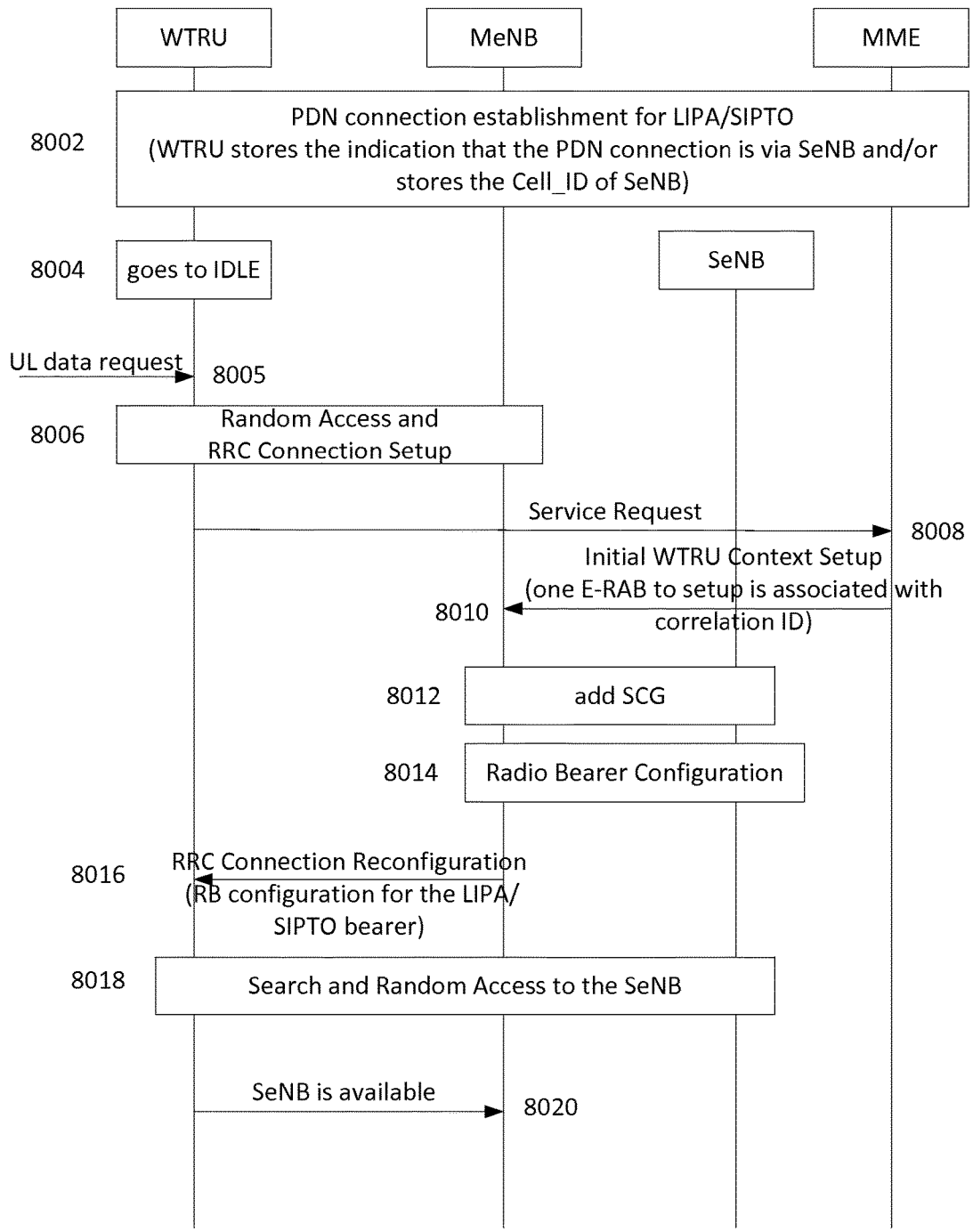
FIG. 8 is of an example technique for a wireless transmit/receive unit (WTRU or User Equipment (UE)) to access LIPA/SIPTO traffic, consistent with embodiments.

FIG. 8 is an illustration of an example technique for a wireless transmit/receive unit (WTRU or User Equipment (UE)) to access LIPA/SIPTO traffic. In some embodiments, access may be triggered by the non-LIPA/SIPTO traffic. The WTRU may access the MeNB (e.g., perhaps immediately and/or without the searching/synchronizing with the SeNB). At 8002, a PDN connection establishment for LIPA/SIPTO may be established. In some embodiments, the WTRU may store the indication that the PDN connection is via SeNB and/or may store the Cell_ID of SeNB. In such scenarios, among others, the MeNB may find out that the WTRU has a LIPA/SIPTO PDN connection (e.g., via a SeNB), perhaps for example, at 8010, after the MeNB may receive the INITIAL WTRU CONTEXT SETUP REQUEST message from the MME. Embodiments contemplate that one or more of the following may be performed to configure the Radio Bearer for the default bearer of the LIPA/SIPTO connection.

At 8004, the WTRU may go into the IDLE mode (e.g., perhaps after some time), at 8005, the WTRU may receive an uplink (UL) data request. The WTRU may determine that the UL data request is for the LIPA/SIPTO.

At 8006, the WTRU may initiate a random access and/or RRC Connection Setup with the MeNB. At 8008, the WTRU may send a service request toward the MME.

At 8012, the MeNB may add the SeNB into the SCG (Small Cell Group) for this WTRU, and/or negotiate the radio bearer configuration with the SeNB signaling (e.g., through the Xn interface (the interface between MeNB and SeNB)). At 8014, the SeNB may provide radio bearer configuration information to the MeNB. At 8016, the MeNB may send the radio bearer configuration in the RRC CONNECTION RECONFIGURATION message to the WTRU. The MeNB may indicate to the WTRU that this Radio Bearer may be connected to the SeNB.

At 8018, the WTRU may start to search and/or synchronize with the SeNB, perhaps for example upon receiving the RRC CONNECTION RECONFIGURATION message, among other scenarios. The WTRU may implement the radio bearer configuration.

At 8020, the WTRU may report the availability of the SeNB to the MeNB (e.g., in one or more RRC measurement report messages). The MeNB may remove the SeNB from the SCG and/or may ask the SeNB to release the Radio Bearer, perhaps if the SeNB may be unavailable, among other scenarios.

In one or more embodiments, the WTRU may search and/or synchronize with the SeNB, perhaps before it may access the MeNB. The WTRU may report the availability of the SeNB in the RRC CONNECTION SETUP REQUEST message to the MeNB. The MeNB may receive the INITIAL WTRU CONTEXT SETUP REQUEST message from the MME and/or may find out that the WTRU has a LIPA/SIPTO PDN connection (e.g., via a SeNB). The WTRU may decide whether to configure the radio bearer for LIPA/SIPTO PDN, perhaps for example based on the availability of the SeNB.

Access may be triggered by the paging caused by the downlink LIPA/SIPTO traffic. The paging message may carry an indication that the paging may be for the LIPA/SIPTO downlink traffic. A corresponding indication may be added in the S5 dummy packets and/or S11 signaling (e.g. DOWNLINK DATA NOTIFICATION), perhaps for example for the MME to know the paging is caused by the LIPA/SIPTO traffic, among other reasons.

The WTRU may check the SeNB availability (e.g., as described herein), perhaps for example before it may access the MeNB, and/or perhaps if the WTRU may receive a Paging with an LIPA/SIPTO indication, among other scenarios.

In some embodiments, there may be no indication of LIPA/SIPTO in the paging message. The WTRU may access (e.g., immediately access) the MeNB and/or check the SeNB availability (as described herein), perhaps for example before the access is made, among other scenarios.

Access may be triggered by the paging caused by the downlink non-LIPA/SIPTO traffic. The WTRU may access (e.g., immediately access) the MeNB and/or check the SeNB availability (as described herein), perhaps before the access, among other scenarios.

Embodiments contemplate WTRU access for SIPTO traffic from idle and/or with an existing SIPTO PDN connection. The MeNB may provide one or more, or more than one, (e.g., SIPTO) LGW IP addresses (e.g., in the S1AP initial message). In some embodiments, perhaps one LGW IP address may be provided (e.g., perhaps in some embodiments perhaps only one) may be provided. The MeNB may indicate that the LGW IP address may be provisional, perhaps for example when only one address may be provided, among other scenarios.

The MME may provide the IP address of the SIPTO LGW and/or the correlation identification (ID) (e.g. in a R12 procedure) to the MeNB, perhaps for example upon the initial WTRU context setup request to the MeNB, and/or perhaps for example if any of the one or more LGW IP addresses provided by MeNB may match the LGW (e.g. LGW IP address) that may be provided in the WTRU context, among other scenarios. In other words, at least one of an existence or a non-existence of a corresponding LGW IP address between the LGW IP address (e.g., in the WTRU context) and the one or more LGW IP addresses (e.g., provided by the MeNB). The MME may start a timer (timer "X" for example). The MME may perform deactivation and/or re-activation of the SIPTO PDN connection, perhaps for example if no match may be found (e.g., determine a non-existence of a corresponding LGW IP address between the LGW IP address and the one or more LGW IP addresses), among other scenarios.

The MeNB may create a data tunnel with the SeNB identified by the LGW IP address and/or correlation ID (e.g., SIPTO U-plane via Xn tunnel), perhaps for example after receiving the WTRU context with the LGW IP address, the corresponding LGW IP address from the MME (e.g. the SIPTO LGW IP address), and/or the correlation ID, among other scenarios. The MeNB may serve (e.g., without a tunnel) as a (e.g., "regular") eNB for the PDN connection (e.g., SIPTO U-plane via SGW), perhaps for example after receiving a WTRU context with the LGW IP address, the corresponding LGW IP address from the MME (e.g. the SIPTO LGW IP address), and/or the correlation ID, among other scenarios.

The MeNB may configure the WTRU to perform one or more measurements of/for one or more S-cells. The MeNB may base the measurement on the LGW IP address that may be provided by MME, perhaps for example to configure the WTRU's measurement with cell/cells that may be associated with the LGW IP address in the WTRU context, the corresponding LGW IP address from the MME (e.g. the SIPTO LGW IP address), and/or the correlation ID, among other scenarios. In other words, an existence or a non-existence of at least one suitable S-cell may be determined based on the one or more measurements, for example.

The MeNB may inform the MME of the S1-U transport address and/or TEIDs of the SeNB for the offloaded bearers, perhaps for example when an S-cell may be configured for the WTRU, among other scenarios. In this message, the MeNB may include an SGW IP address of the SeNB, perhaps for example if the configured SeNB may support SIPTO collocated LGW, and/or perhaps for example if the offloaded bearer may include the correlation ID, among other scenarios. The MeNB may signal the WTRU's correlation ID to SeNB, perhaps for example if the LGW address may be previously identified, and/or perhaps for example during the establishment of the Xn interface, among other scenarios. The SeNB may start sending and/or receiving SIPTO PDN data (e.g., send/receive directly) to/from the WTRU, perhaps for example after the MeNB may complete the RRC reconfiguration procedure, among other scenarios.

The SeNB may stop sending data to MeNB (e.g., via a SGW and/or the tunnel established previously), perhaps for example by including a last packet as a marker packet. The SeNB might not start sending new (e.g., fresh or updated) data to WTRU (e.g., directly), perhaps for example until it has received the marker packet (e.g., via the Xn interface from MeNB, perhaps as part of a bearer handover process), among other scenarios.

The MME may stop the timer X, perhaps for example if any LGW may be identified, among other scenarios. The MME may perform deactivation and/or reactivation of SIPTO PDN connection with WTRU, perhaps for example if the signal to the MME may have identified a LGW different from the one in WTRU context, among other scenarios.

The MME may perform deactivation and/or reactivation of SIPTO PDN connection with WTRU, for example by configuring or reconfiguring (e.g., offloading) the SIPTO PDN connection to a PGW (e.g. above RAN), perhaps for example if timer X may expire without the existence of at least one suitable S-cell being determined. For example, no SeNB with collocated LGW may be identified during the measurement procedure and/or no S-cells may have measured above a threshold. In other words one or more suitable or useable S-cells may be or might not be determined, among other scenarios.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A small cell evolved NodeB device (SeNB), comprising:
    a processor, configured at least to:
        receive, via an X2 interface, a correlation identification (ID) from a macro evolved NodeB (MeNB);
        determine an Internet Protocol (IP) address for a local gateway (LGW) that is collocated with the SeNB;
        send, via the X2 interface, the address of the collocated LGW to the MeNB; and
        utilize the correlation ID to establish a path through the collocated LGW for a bearer of a packet data network (PDN) connection, wherein the bearer is a local Internet Packet (IP) access (LIPA) bearer or a selected IP traffic offload (SIPTO) bearer.

2. The SeNB of claim 1, wherein the processor is further configured to send, via the X2 interference, the IP address of the collocated LGW to the MeNB to provide support for the LIPA bearer or SIPTO bearer at a local network with the collocated LGW in a dual connectivity mode with a wireless transmit/receive unit (WTRU).

3. The SeNB of claim 1, wherein the processor is further configured to receive a request to establish a local network connection from the WTRU.

4. The SeNB of claim 3, wherein the local network connection is a LIPA connection or a SIPTO connection.

5. The SeNB of claim 1, wherein the IP address determined for the collocated LGW is the IP address of the SeNB.

6. The SeNB of claim 1, wherein SeNB and the MeNB have a same local home network (LHN) identification.

7. The SeNB of claim 1, wherein the collocated LGW is at least one of a local packet data network (PDN) gateway, a LIPA gateway, or a SIPTO gateway.

8. A small cell evolved NodeB device (SeNB), comprising:
    a memory; and
    a processor, the processor configured to:
        receive, via an X2 interface, a correlation identification (ID) from a macro evolved NodeB (MeNB);
        determine an internet protocol (IP) address for a local gateway (LGW) that is collocated with the SeNB, wherein the LGW at least one of a local packet data network (PDN) gateway, a local IP access (LIPA) gateway, or a selected IP traffic (SIPTO) gateway;
        send, via the X2 interface, the IP address of the collocated LGW to the MeNB; and
        utilize the correlation ID to establish a path through the collocated LGW for a bearer of a packet data network (PDN) connection, wherein the bearer is a LIPA bearer or a SIPTO bearer.

9. The SeNB of claim 8, wherein the processor is further configured to send, via the X2 interference, the IP address of the collocated LGW to the MeNB to provide support for the LIPA bearer or SIPTO bearer at a local network with the collocated LGW in a dual connectivity mode with a wireless transmit/receive unit (WTRU).

10. The SeNB of claim 8, wherein the processor is further configured to receive a request to establish a local network connection from the WTRU.

11. The SeNB of claim 10, wherein the local network connection is a LIPA connection or a SIPTO connection.

12. The SeNB of claim 8, wherein the IP address determined for the LGW is the IP address of the SeNB.

13. The SeNB of claim 1, wherein SeNB and the MeNB have a same local home network (LHN) identification.

14. A method for using a local internet protocol (IP) access bearer or a selected IP traffic (SIPTO) bearer at a small cell evolved nodeB (SeNB) with dual connectivity, the method comprising:
    receiving, at the SeNB via an X2 interface, a correlation identification (ID) from a macro evolved NodeB (MeNB);
    determining, at the SeNB, an internet protocol (IP) address for a local gateway (LGW) that is collocated with the SeNB;
    sending, at the SeNB via the X2 interface, the IP address of the collocated LGW to the MeNB; and
    utilize the correlation ID, at the SeNB, to establish a path through the collocated LGW for a bearer of a packet data network (PDN) connection, wherein the bearer is a local IP access (LIPA) bearer or a selected IP traffic (SIPTO) bearer.

15. The method of claim 14, wherein sending the IP address of the collocated LGW to the MeNB provides support for the LIPA bearer or SIPTO bearer at a local network with the collocated LGW in a dual connectivity mode with a wireless transmit/receive unit (WTRU).

16. The method of claim 14, further comprising receiving request to establish a local network connection from the WTRU.

17. The method of claim 16, wherein the local network connection is a LIPA connection or a SIPTO connection.

18. The method of claim 14, wherein the IP address determined for the collocated LGW is the IP address of the SeNB.

19. The method of claim 14, wherein SeNB and the MeNB have a same local home network (LHN) identification.

20. The method of claim 14, wherein the collocated LGW is at least one of a local packet data network (PDN) gateway, a LIPA gateway, or a SIPTO gateway.

* * * * *

UNITED STATES PATENT AND TRADEMARK OFFICE
CERTIFICATE OF CORRECTION

PATENT NO. : 10,182,382 B2
APPLICATION NO. : 15/122285
DATED : January 15, 2019
INVENTOR(S) : Saad Ahmad et al.

Page 1 of 1

It is certified that error appears in the above-identified patent and that said Letters Patent is hereby corrected as shown below:

In the Claims

Column 21, Line 43: insert --IP-- between "the" and "address"

Column 22, Line 9: insert --is-- after "LGW"

Signed and Sealed this
Nineteenth Day of March, 2019

Andrei Iancu
*Director of the United States Patent and Trademark Office*